US009218745B2

(12) United States Patent
Choquet

(10) Patent No.: US 9,218,745 B2
(45) Date of Patent: *Dec. 22, 2015

(54) VIRTUAL SIMULATOR METHOD AND SYSTEM FOR NEUROMUSCULAR TRAINING AND CERTIFICATION VIA A COMMUNICATION NETWORK

(71) Applicant: 123 Certification, Inc., Montreal (CA)

(72) Inventor: Claude Choquet, Montreal (CA)

(73) Assignee: 123 CERTIFICATION INC., Montreal (CA)

( * ) Notice: Subject to any disclaimer, the term of this patent is extended or adjusted under 35 U.S.C. 154(b) by 204 days.

This patent is subject to a terminal disclaimer.

(21) Appl. No.: 13/829,855

(22) Filed: Mar. 14, 2013

(65) Prior Publication Data
US 2013/0203029 A1 Aug. 8, 2013

Related U.S. Application Data

(63) Continuation of application No. 10/540,216, filed as application No. PCT/CA03/01987 on Dec. 19, 2003, now Pat. No. 8,428,926.

(30) Foreign Application Priority Data

Dec. 19, 2002 (CA) ..................... 2412109

(51) Int. Cl.
*G06G 7/58* (2006.01)
*G09B 5/00* (2006.01)
*G09B 19/00* (2006.01)

(52) U.S. Cl.
CPC .............. *G09B 5/00* (2013.01); *G09B 19/003* (2013.01)

(58) Field of Classification Search
CPC ....................................................... G09B 5/00
USPC ............................................................ 703/11
See application file for complete search history.

(56) References Cited

U.S. PATENT DOCUMENTS

| 4,680,014 | A | 7/1987 | Paton et al. |
| 4,687,685 | A | 8/1987 | Melcher |
| 4,931,018 | A | 6/1990 | Herbst et al. |
| 5,727,950 | A | 3/1998 | Cook et al. |
| 5,986,643 | A | 11/1999 | Harvill et al. |
| 6,035,274 | A | 3/2000 | Kramer et al. |
| 6,074,213 | A | 6/2000 | Hon |
| 6,104,379 | A | 8/2000 | Petrich et al. |
| 6,190,178 | B1 | 2/2001 | Oh |
| 6,222,523 | B1 | 4/2001 | Harvill et al. |
| 6,371,765 | B1 | 4/2002 | Wall et al. |
| 2001/0023059 | A1 | 9/2001 | Toki |
| 2002/0042698 | A1 | 4/2002 | Meuris et al. |
| 2002/0106617 | A1 | 8/2002 | Hersh |
| 2003/0077556 | A1 | 4/2003 | French et al. |

FOREIGN PATENT DOCUMENTS

CA 2311685 12/2001

OTHER PUBLICATIONS

Zhai et al., "Association for Computing Machinery: The Influence of Muscle Groups on Performance of Multiple Degree-of-Freedom Input," Common Ground, Chi '96 Conference Proceedings, Conference on Human Factors in Computing Systems, Vancouver: Apr. 13-18, 1996, New York, ACM, US, Apr. 13, 1996, pp. 308-315.
Delp et al., "Surgical Simulation: An Emerging Technology for Training in Emergency Medicine," Presence, vol. 16, No. 2, Apr. 1997, pp. 147-159.
Gomez et al., "Integration of the Rutgers Master II in a Virtual Reality Simulation," Proceedings of the Virtual Reality Annual International Symposium, Research Triangle Park, Mar. 11-15, 1995, Los Alamitos, IEEE Comp. Soc. Press, US, Mar. 11, 1995.
"Certification" Merriam-Webster's Online Dictionary, 2010, http://www.merriam-webster.com/dictionary/certification, 2pgs.
"Certify" Merriam-Webster's Online Dictionary, 2010, http://www.merriam-webster.com/dictionary/certify, 2pgs.

*Primary Examiner* — Jerry Lin
(74) *Attorney, Agent, or Firm* — The Marbury Law Group, PLLC

(57) ABSTRACT

A system for neuromuscular training via a communication network, including a computer processor connectable to the communication network, the processor capable of performing operations including: retrieving data representative of a training scenario from a database in response to a user selection on an input device, generating test elements, parameters and controls based on the retrieved data, monitoring use of the input device by the user, performing calculations of a simulated environment in response to the use of the input device by the user and the test elements, parameters and controls, generating real time images replicating the simulated environment of management of the test elements by the user and recording results of the simulation in the database.

27 Claims, 21 Drawing Sheets

| YOUR LOGO, YOUR COMPANY | CARD NO 0472-2 | WELDER & WELDING OPERATOR QUALIFICATION REPORT |
| --- | --- | --- |
| | | CERTIFIED COMPLIANT OF THE CODE: AWS D1.1 |
| CARD HOLDER ⑧¹ | WELDER'S NAME | TEST BY: CLAUDE CHOQUET ⑧⁴ |
| EMISSION DATE | JUNE 13 2001 | DATE OF APPROBATION 15 JUIN 2000 ⑧⁵ |
| EXPIRATION DATE | JUNE 13 2003 ⑧² | APPROVED BY: |
| PROCESS | GMAW | SUPERVISER'S NAME |
| POSITION | FLAT | |
| ELECTRODE/FILLER METAL | ER480-S6 ⑧³ | SUPERVISER |
| MINIMUM PERMITTED TH'K | 5/8 " | HOLDER'S SIGNATURE |

| Ellipse X | Ellipse Y | Ellipse height | Ellipse width | Arc speed | Min. Weight | Weight | Max. weight | Weight OK | Surface Fusion | Surface | Penetration | Penetration OK |
|---|---|---|---|---|---|---|---|---|---|---|---|---|
| 317.0 | 91.0 | 28.27981238... | 15.6913635... | 14 | 0.04256875 | 0.04149... | 0.1457728... | Incorrect | 0.077836498... | 0.030465... | 2.3667558551... | Sufficient |
| 317.0 | 92.0 | 28.27981238... | 15.6913635... | 14 | 0.04256875 | 0.04149... | 0.1457728... | Incorrect | 0.077836498... | 0.030465... | 2.3667558551... | Sufficient |
| 316.0 | 93.0 | 23.48139953... | 18.8978861... | 0 | 0.014188958 | 0.04149... | 0.1152576... | Correct | 3.887454294... | 0.091396... | 1.7946064686... | Insufficient |
| 316.0 | 93.0 | 22.87844284... | 19.3959361... | 0 | 0.01064218... | 0.04149... | 0.1114432... | Correct | 21.23039182... | 0.121861... | 1.6329483930... | Insufficient |
| 315.0 | 95.0 | 32.35724241... | 13.7140492... | 22 | 0.06689375 | 0.04149... | 0.1719287... | Incorrect | 0.029690683... | 0.019387... | 2.4546806337... | Sufficient |
| 314.0 | 96.0 | 32.35724241... | 13.7140492... | 22 | 0.06689375 | 0.04149... | 0.1719287... | Incorrect | 0.028690683... | 0.019387... | 2.4546806337... | Sufficient |
| 313.0 | 97.0 | 32.35724241... | 13.7140492... | 22 | 0.06689375 | 0.04149... | 0.1719287... | Incorrect | 0.029690683... | 0.019387... | 2.4546806337... | Sufficient |
| 313.0 | 98.0 | 34.38375771... | 12.9057684... | 26 | 0.079055625 | 0.04149... | 0.1850066... | Incorrect | 0.021889105... | 0.016404... | 2.4724700616... | Sufficient |
| 312.0 | 98.0 | 34.38375771... | 12.9057684... | 26 | 0.079055625 | 0.04149... | 0.1850066... | Incorrect | 0.021889105... | 0.016404... | 2.4724700616... | Sufficient |
| 311.0 | 100.0 | 28.27981238... | 15.6913635... | 14 | 0.04256875 | 0.04149... | 0.1457728... | Incorrect | 0.077836498... | 0.030465... | 2.3667558551... | Sufficient |
| 310.0 | 102.0 | 28.27981238... | 15.6913635... | 14 | 0.04256875 | 0.04149... | 0.1457728... | Incorrect | 0.077836498... | 0.030465... | 2.3667558551... | Sufficient |
| 309.0 | 104.0 | 28.27981238... | 15.6913635... | 14 | 0.04256875 | 0.04149... | 0.1457728... | Incorrect | 0.077836498... | 0.030465... | 2.3667558551... | Sufficient |
| 307.0 | 105.0 | 35.39397863... | 12.5374094... | 28 | 0.0851375 | 0.04149... | 0.1915456... | Incorrect | 0.019254585... | 0.015232... | 2.4787008669... | Sufficient |
| 306.0 | 106.0 | 35.39397963... | 12.5374094... | 28 | 0.0851375 | 0.04149... | 0.1915456... | Incorrect | 0.019254585... | 0.015232... | 2.4787008669... | Sufficient |
| 305.0 | 108.0 | 36.90552824... | 12.0239114... | 31 | 0.09425937... | 0.04149... | 0.2013541... | Incorrect | 0.016246300... | 0.013758... | 2.4858128166... | Sufficient |
| 304.0 | 109.0 | 36.90552824... | 12.0239114... | 31 | 0.09425937... | 0.04149... | 0.2013541... | Incorrect | 0.016246300... | 0.013758... | 2.4858128166... | Sufficient |
| 303.0 | 110.0 | 36.90552924... | 12.0239114... | 31 | 0.09425937... | 0.04149... | 0.2013541... | Incorrect | 0.016246300... | 0.013758... | 2.4858128166... | Sufficient |

Close

VIRTUAL SIMULATOR METHOD AND SYSTEM FOR NEUROMUSCULAR TRAINING AND CERTIFICATION VIA A COMMUNICATION NETWORK

CROSS REFERENCE TO RELATED PATENT APPLICATION

This application is a continuation of application Ser. No. 10/540,216, filed Jun. 20, 2005, which was the National Stage of International Application No. PCT/CA2003/001987, filed Dec. 19, 2003, which claims the benefit of Canadian Patent CA 2,412,109, filed Dec. 19, 2002, the contents of which hereby incorporated reference in their entirety.

FIELD

The field of the invention Is related to professional work, labour or craft activities, sport or even physical rehabilitation requirements where the skills, dexterity or neuromuscular ability is required to performed physical activities in a precise environment with electronic tutoring systems and methods, and more particularly, to an interactive computer-based training system and method operable over an Internet Protocol (IP)-based public computer network such as the Internet, a corporate Intranet, and the like. This precise environment can be located in a online database for code of conduct, state-of-the-art, physic laws or technical code for physical activities requiring training and certification.

SUMMARY

By practicing online virtual certification over the Internet and the World Wide Web, it has become obvious that a technological gap exists between traditional certification and online certification. This gap is related to the fact that there is no available technology in the Internet Protocol (IP)-based public computer network such as the Internet, corporate Intranet or the like for the physical and cerebral training to accomplish a minimum dexterity required by code, rule of the art or any physical function requiring minimum requirements related to neuromuscular activities.

For example, an online 2D, 3D, near 3D visual multimedia signal and auditory signal can create an environment that could easily simulate visual inspection, non-destructive examination or destructive examination to ensure neuromuscular workmanship or craftsmanship requirements or skill training dexterity. Instead of learning by traditional manual approach, a simulator method develops all the minimum requirements needed in profession, industry, field, sport or rehabilitation activities.

The Implementation of virtual simulator method and system are also intended to help the trainee to learn a technique and not to cope with difficult environment. For example, in a traditional welding training center, the welder trainee has first to compose with the difficult environment of the welding electric arc (eye protection and gaseous emanations and other complex technical considerations). Also in a typical approach, a trainee can easily spare a very considerable amount of money before handling very expensive material and technology.

According to the present invention, there is provided a virtual simulator system for neuromuscular training and certification via a communication network, comprising:
a database connectable to the communication network, the database storing data relative to a code of conduct, state-of-the-art, physics law equations, technical code and technique for physical activities requiring training and certification for a user, and training scenarios complying with the code of conduct, state-of-the-art, physics law equations, technical code and technique;
a multimedia device connectable to the communication network, the multimedia device having a stopwatch circuit and an input device for interaction with a user; and
an on-line simulator processor connectable to the communication network, the on-line simulator processor performing operations comprising:
retrieving data representative of one of the training scenarios from the database in response to a user selection on the multimedia device;
generating test elements, parameters and controls based on the data;
monitoring online use of the input device by the user;
performing calculations of a simulated environment on time and online in response to the use of the input device by the user and management of the test elements, parameters and controls by the user;
generating real time images on the multimedia device replicating the simulated environment according to the management of the test elements by the user as a function of run-time data provided by the stopwatch circuit; and
recording the test elements In the database.

According to the present invention, there is also provided a virtual simulator method for neuromuscular training and certification via a communication network, comprising the steps of:
storing data relative to a code of conduct, state-of-the-art, physics law equations, technical code and technique for physical activities requiring training and certification for a user, and training scenarios in a database connectable to the communication network;
providing a multimedia device connectable to the communication network, the multimedia device having a stopwatch circuit and an input device for interaction with a user; and
through an on-line simulator processor connectable to the communication network, performing operations comprising:
retrieving data representative of one of the training scenarios from the database in response to a user selection on the multimedia device;
generating test elements, parameters and controls based on the data;
monitoring online use of the input device by the user;
performing calculations of a simulated environment on time and online in response to the use of the input device by the user and management of the test elements, parameters and controls by the user;
generating real time Images on the multimedia device replicating the simulated environment according to the management of the test elements by the user as a function of run-time data provided by the stopwatch circuit; and
recording the test elements in the database.

According to the present invention, there is also provided a multimedia device connectable to a virtual simulator system having an on-line simulator processor and a database for neuromuscular training and certification via a communication network, comprising:
a stopwatch circuit;
an input device;
a user interface;
a port for communication with the on-line simulator processor through the communication network; and
a processor connected to the stopwatch circuit, the Input device, the user interface and the port, the processor comprising means for transmitting data produced by use of the input device on the user interface to the on-line simulator processor via the port;

receiving test elements, parameters and controls and simulated environment data from the on-line simulator processor via the port;

monitoring a management of the test elements, parameters and controls by the user as a function of run-time data provided by the stopwatch circuit; and displaying real time images on the user interface replicating a simulated environment using the simulated environment data according to the management by the user.

According to the present invention, there is also provided an apparatus for neuromuscular training and certification on a multimedia device via a communication network, comprising a database connectable to the communication network, the database storing data relative to a code of conduct, state-of-the-art, physics law equations, technical code and technique for physical activities requiring training and certification for a user, and training scenarios complying with the code of conduct, state-of-the-art, physics law equations, technical code and technique; and an on-line simulator processor connectable to the communication network, the on-line simulator processor performing operations comprising:

retrieving data representative of one of the training scenarios from the database In response to a request received from the multimedia device representing a user selection;

generating test elements, parameters and controls based on the data;

communicating the test elements, parameters and controls to the multimedia device;

monitoring user activity data received from the multimedia device;

performing calculations of a simulated environment on time and online in response to the user activity data in relation with the test elements, parameters and controls;

transmitting simulation data to the multimedia device causing the multimedia device to generate real time images replicating the simulated environment according to the user activity data; and recording the test elements in the database.

According to the present invention, there is also provided a computer readable memory having recorded thereon statements and instructions for execution by a computer system to carry out the above method.

According to the present invention, there is also provided a computer program product, comprising:

a memory having computer readable code embodied therein, for execution by an on-line simulator processor, for neuromuscular training and certification via a communication network, said code comprising:

code means for storing data relative to a code of conduct, state-of-the-art, physics law equations, technical code and technique for physical activities requiring training and certification for a user, and training scenarios in a database connected to the communication network; and code means for retrieving data representative of one of the training scenarios from the database in response to a user selection on a multimedia device connected to the communication network;

code means for generating test elements, parameters and controls based on the data;

code means for monitoring online use of an input device on the multimedia device by the user;

code means for performing calculations of a simulated environment on time and online in response to the use of the input device by the user and management of the test elements, parameters and controls by the user;

code means for generating real time images on the multimedia device replicating the simulated environment according to the management of the test elements by the user as a function of run-time data provided by a stopwatch circuit of the multimedia device; and code means for recording the test elements in the database.

According to the present invention, there is also provided a carrier wave embodying a computer data signal representing sequences of statements and instructions which, when executed by an on-line simulator processor, cause the on-line simulator processor to perform a virtual simulation for neuromuscular training and certification via a communication network, the statements and instructions comprising the steps of:

storing data relative to a code of conduct, state-of-the-art, physics law equations, technical code and technique for physical activities requiring training and certification for a user, and training scenarios in a database connected to the communication network; and retrieving data representative of one of the training scenarios from the database in response to a user selection on a multimedia device connected to the communication network;

generating test elements, parameters and controls based on the data;

monitoring online use of an input device on the multimedia device by the user;

performing calculations of a simulated environment on time and online in response to the use of the input device by the user and management of the test elements, parameters and controls by the user;

generating real time images on the multimedia device replicating the simulated environment according to the management of the test elements by the user as a function of run-time data provided by a stopwatch circuit of the multimedia device; and recording the test elements in the database.

According to the present invention, there is also provided a memory for storing data for access by an application program being executed on a data processing system, comprising:

a data structure stored in the memory, the data structure including information resident in a database used by the application program and including:

code of conduct data;

state-of-the-art data;

physics law equation data;

technical code and technique data for physical activities requiring training and certification for a user; and training scenarios complying with the code of conduct, state-of-the-art, physics law equations, technical code and technique, to be used by the application program to generate test elements, parameters and controls for neuromuscular training and certification via a communication network.

The following provides a non-restrictive outline of certain features of the invention more fully described herein after.

The present invention relates to a virtual simulator method and system for neuromuscular training and certification of profession, trade, craft, sport or rehabilitation activities via a communication network and more particularly to an online multifunctional virtual training platform which implements certain predefined certification neuromuscular standards. Such method and system, which can be viewed as a service, are particularly useful for enhancing communication and exchanges between trainer and trainee seeking training with third party witnessing services for certification purposes.

Any physical activities that require a minimal dexterity requirement can benefit from this invention. For example it is common knowledge that neuromuscular skills (by opposition of neurocerebral skills) are essential for basic requirement of specialized physical activities for a professional work, labour or craft activities, sport or even physical rehabilitation.

Neuromuscular virtual online training or certification can be simulated, for example, for speed control, acceleration, strength, precision or any neuromuscular abilities related to a direct relation with physical action and neurological responses.

For example, skill ability for a profession, trade, craft or sport example could be welding. The welding ability to perform a sound weld according to code requirement is of a particular interest since it could involve safety, liability and life duration of assembled material. In the field of welding, many scientific relations between welding variables are known by experts but no relation between welder dexterity and state-of-the-art equations have been documented yet. This approach can minimize physical test cost. These costs could increase easily when the test material is technological (welding station, welding consumables and metal plates and specialist's time). One prototype of such a Web site is under confidential research and development in an online virtual certification site, for the assignee of the present application. This site provides an example of one possible implementation of this invention. The site is used as an online training tool by school, association, certification bureau, consumable or equipment supplier, plant or shop. Such organisms can access updated information about the trainee member status and related information about all the steps involved in the training and certification of this welding process trainee. The member can disclose some of this information to a third party in the course of their technical or business relationship with that member. This Web site contains a welding virtual simulator method and system able to demonstrate to a trainer or a third party the ability of a trainee. This virtual simulator method and system are also able to help the trainer to isolate the specialized neuromuscular skills that the trainee has to practice to insure himself of good results when over a demonstration of his skills is required.

With the help of physic laws equation such as dynamic, mechanic of fluid and thermodynamic, the dexterity of the welder can be demonstrated by an online virtual simulator method and system to a trainer, immediate superior or certification representative for learning curve demonstration or for code minimum requirements. Prior to a physical test or to an online third party witnessing operation, a database configuration with the processor is performed to ensure sound weld, weld size, maximum root penetration with metal transfer mode used in conjunction will the welding parameter settings.

This virtual simulator method and system can enable any weld assembly and fulfills all criteria of a welder test such as defined by a welding code by simply activating a computer screen signal by the multimedia device. A good example of this online neuromuscular virtual simulator method and system applied In the field of welding is a traditional T joint assembly of a weld assembly (FIG. 12) to insure efficient weld penetration and weld size achievement without other code defect such as porosity, cracks or undercut. Code compliance and trainee, trainer and/or third party witnessing expert receives information from the virtual simulator method and system according to authorized request.

This above example of neuromuscular training for welder is described hereafter with the help of the drawings.

It also serves to structure steps and processes implemented by companies for quality, cost and delay controls and other purposes. This leads to more efficient dissemination of information about the qualifications and competencies of persons being certified with the present invention. It therefore leads to a wider recognition of trainees for companies and other organizations using the invention.

Preferably, the manual dexterity virtual simulator method and system with the third party witnessing method involve the use of a system as described in Can. Pat. No. 2,311,685 issued to Choquet. Such a manual training Is advantageous in that it permits a controlled input of essential variables to required tasks with third party witnessing certification.

BACKGROUND OF THE PRESENT INVENTION

Training method or simulator devices are in the art. There is a wide list of methods and devices reproducing a physical activity where human skills are of main concerns. But they are all related to an hardware simulator. The term hardware simulator is commonly used in the trade because the vast majority of simulators require hardware tools associated software to accurately help a user to perform his/her physical activities and an object to complete the simulated task. Typical simulators of this type are shown, for example, in the following patents documents.

| | |
|---|---|
| FR 2 827 066 | Dasse Michel & Streib Dominique |
| U.S. Pat. No. 6,477,665 | Bowman-Amuah; Michel K. |
| U.S. Pat. No. 6,371,765 | Wall et al |
| U.S. Pat. No. 6,098,458 | French & Ferguson |
| U.S. Pat. No. 6,056,556 | Braun et al |
| U.S. Pat. No. 6,033,226 | Bullen et al |
| U.S. Pat. No. 5,320,538 | Baum; David R. |
| U.S. Pat. No. 4,931,018 | Herbst et al |
| U.S. Pat. No. 4,680,014 | Paton et al |
| U.S. Pat. No. 4,124,944 | Blair; Bruce A. |

Though such simulators have achieved considerable popularity and possibly commercial success, there has been a continuing need for improvement. Summary of the present invention does not need any particular hardware simulator to reproduce the training environment. Its interest resides in the software control and management of neuromuscular data collected over image collection simulating environment where the skill or dexterity is of major concern to accomplish a minimum requirement by code, rule of the art or any physical function requiring minimum requirements related to neuromuscular activities.

BRIEF DESCRIPTION OF THE DRAWINGS

The objects and features of the present invention will become more apparent in conjunction with the accompanying drawings:

FIG. 8 is a diagram showing an example of a card holder used in the system according to the present invention.

FIG. 11 is a multimedia shooting view of a Virtual Dexterity Simulator (VDS).

FIG. 19 shows an example of mathematical results of a neuromuscular test according to the present invention.

DETAILED DESCRIPTION

Figure 1:
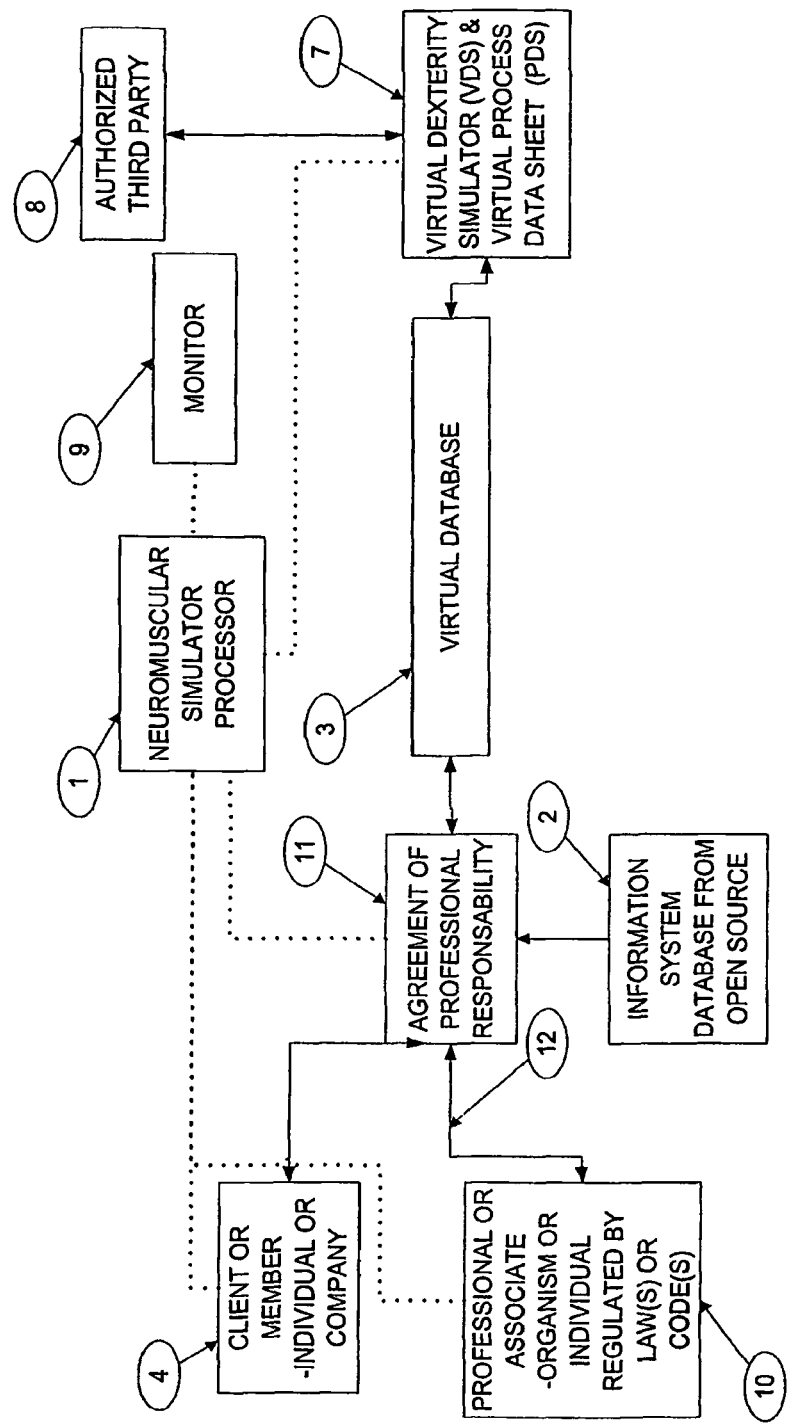
FIG. 1 is a block diagram showing a simulator system according to the present invention.
Figure 3:
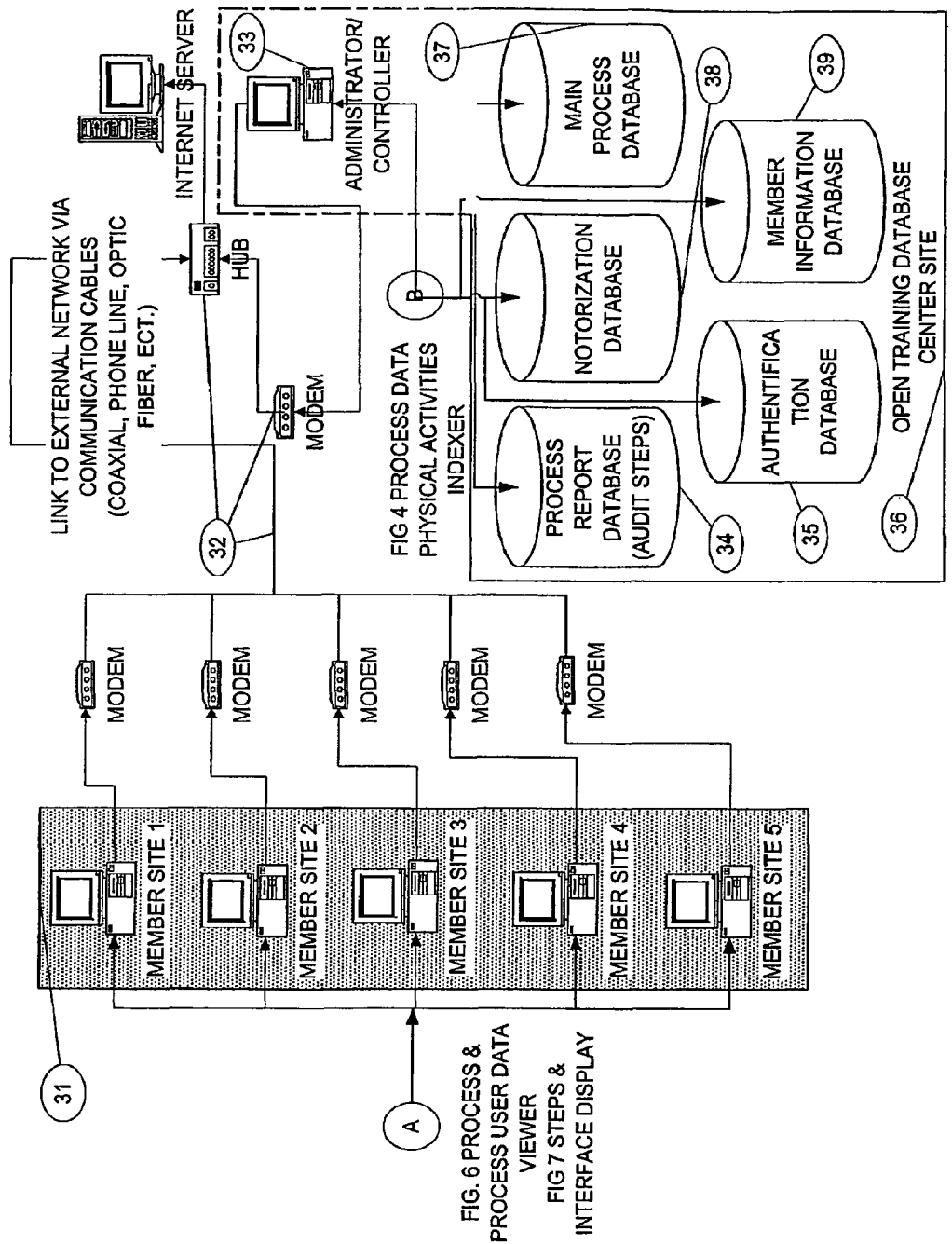
FIG. 3 is a schematic diagram illustrating a system according to the present invention.

Referring to FIG. 1, training scenarios are retrieve from the information system database 2 and then processed by the neuromuscular simulator processor 1 to the required trainee level. The data storage will be kept in virtual database 3 referring to FIG. 3, there is shown a detailed open training database center site 36.

A description will now be given, in detail, of an embodiment in accordance with the present invention. The present invention Is not restricted to this embodiment.

Figure 4:
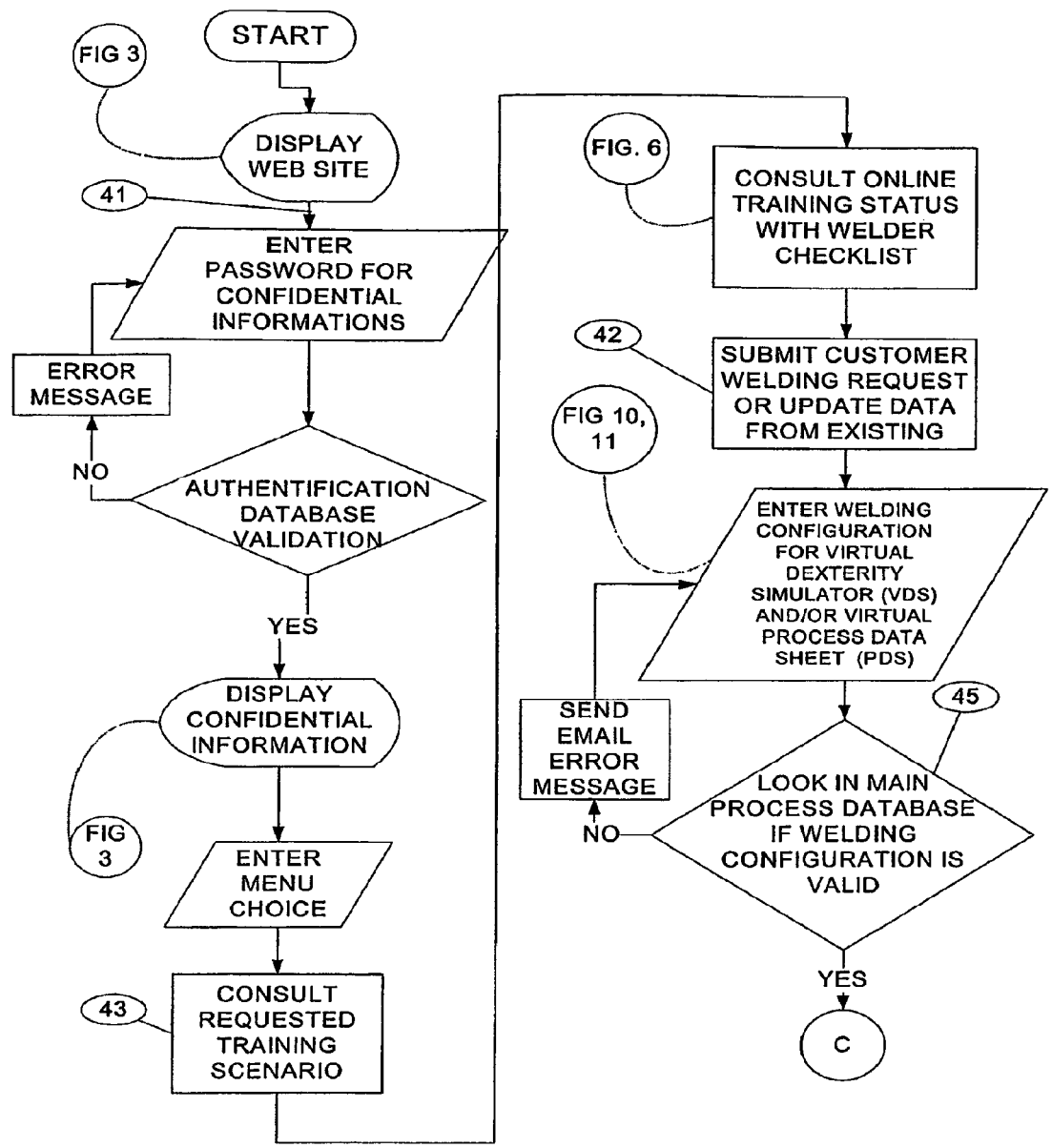
FIG. 4 is a flowchart showing a general process followed by the system according to the present invention.
Figure 4:
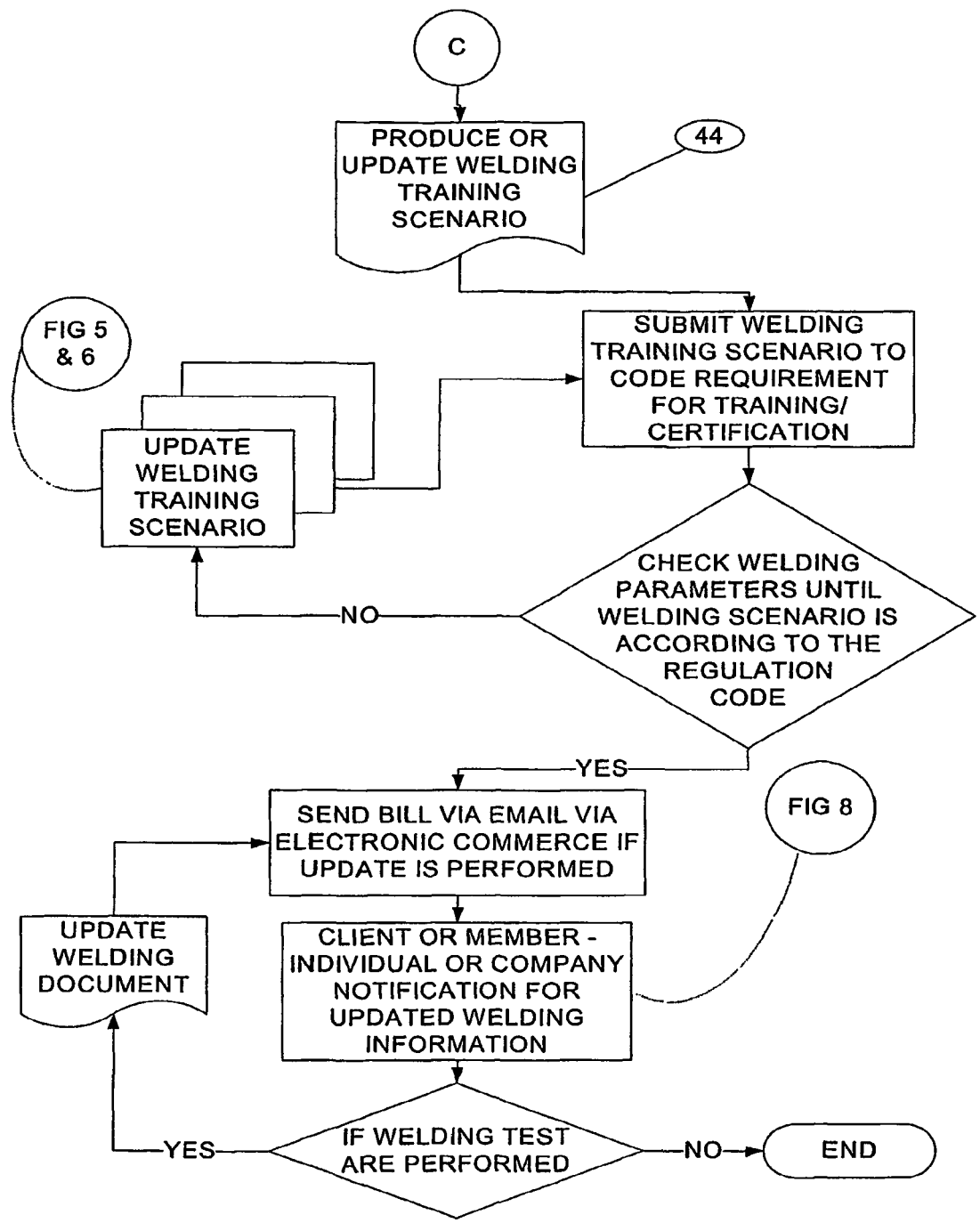
Figure 10:
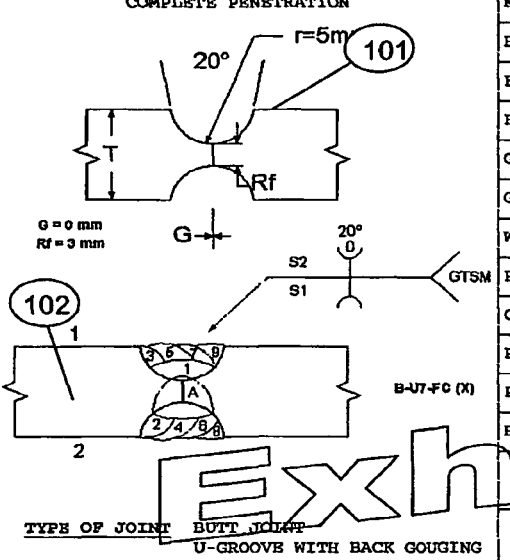
FIG. 10 is a diagram showing an example of a list of essential variables for certification use in the system according to the present invention.
Figure 11:
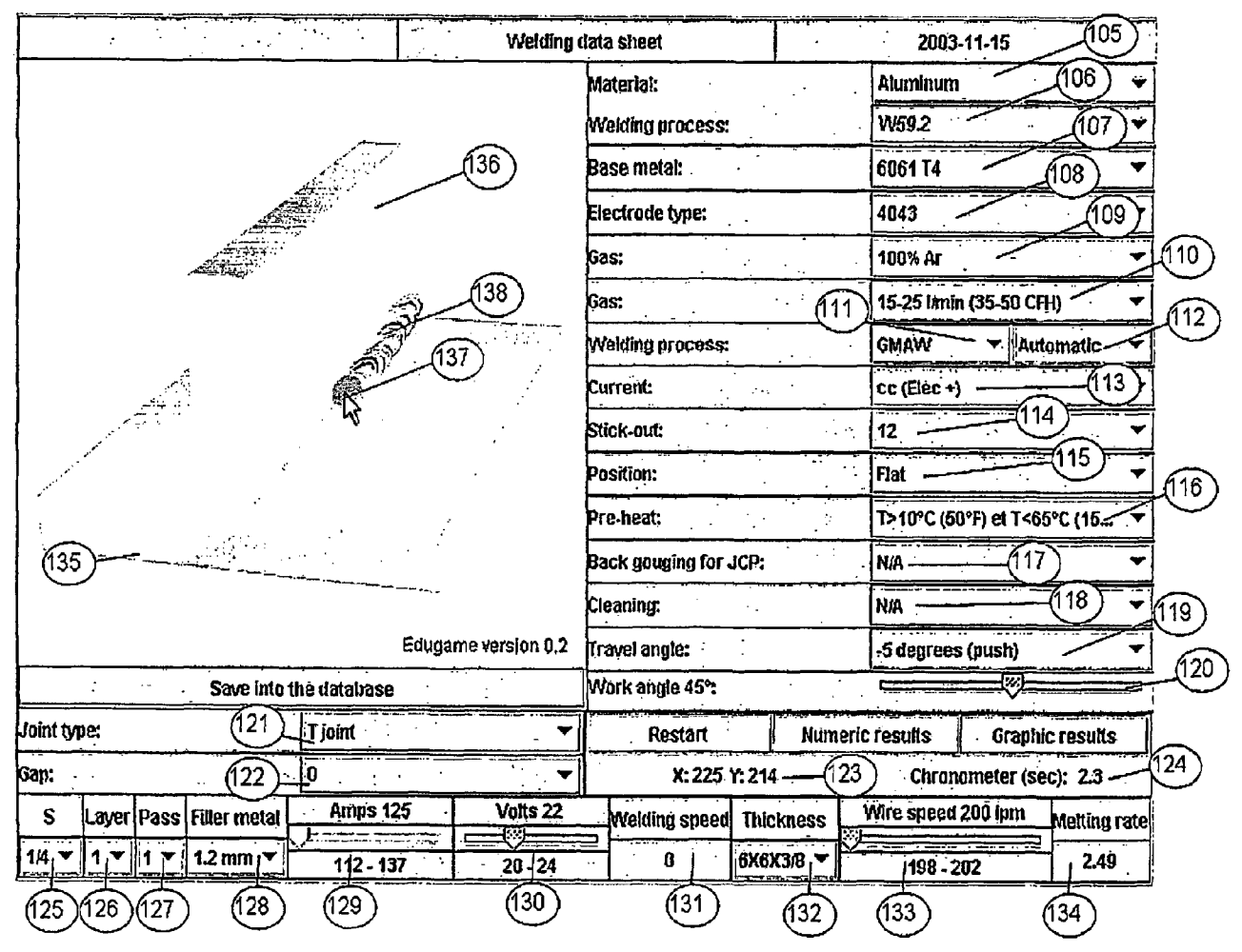

Referring to FIG. 4, there is shown a welding scenario flowchart detailing a general training process followed by the system according to the present invention. The retrieved welding scenario 43 is processed online to ensure code and trainee accurate revision status. Welding training scenarios are multimedia information. Specific information about the input of welding training scenarios is shown in FIGS. 10 and 11.

Looping step 44 is responsible to verify the welding configuration validation with code requirement and state-of-the-art physical activities. Welding configuration, code requirements are manage in this loop until scientific and code requirements are met.

Figure 5:
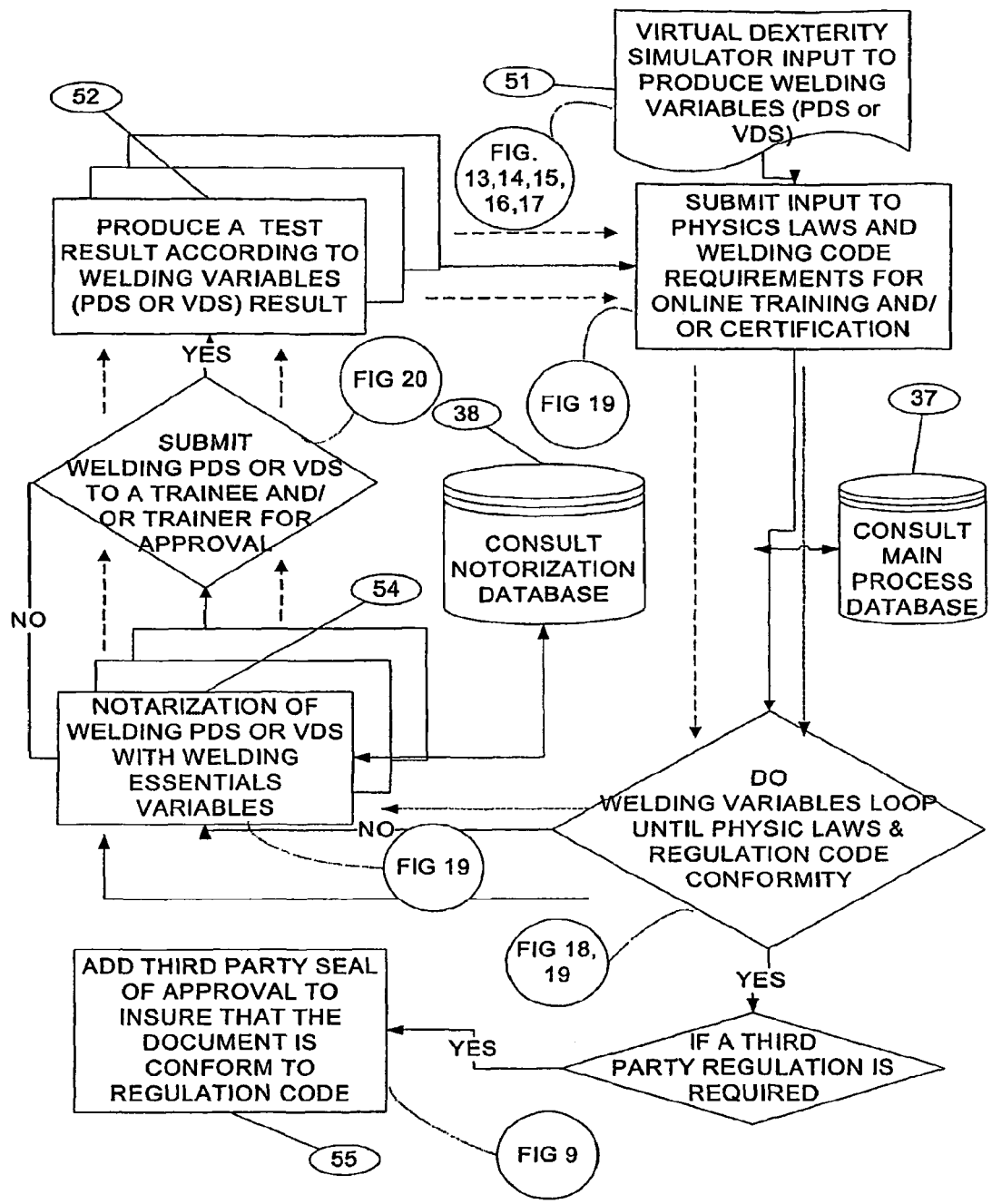
FIG. 5 is a flowchart showing a database consulting process followed by the system according to the present invention.

Referring to FIG. 5, there is shown a sequence for updating a welding training scenario.

Figure 6:
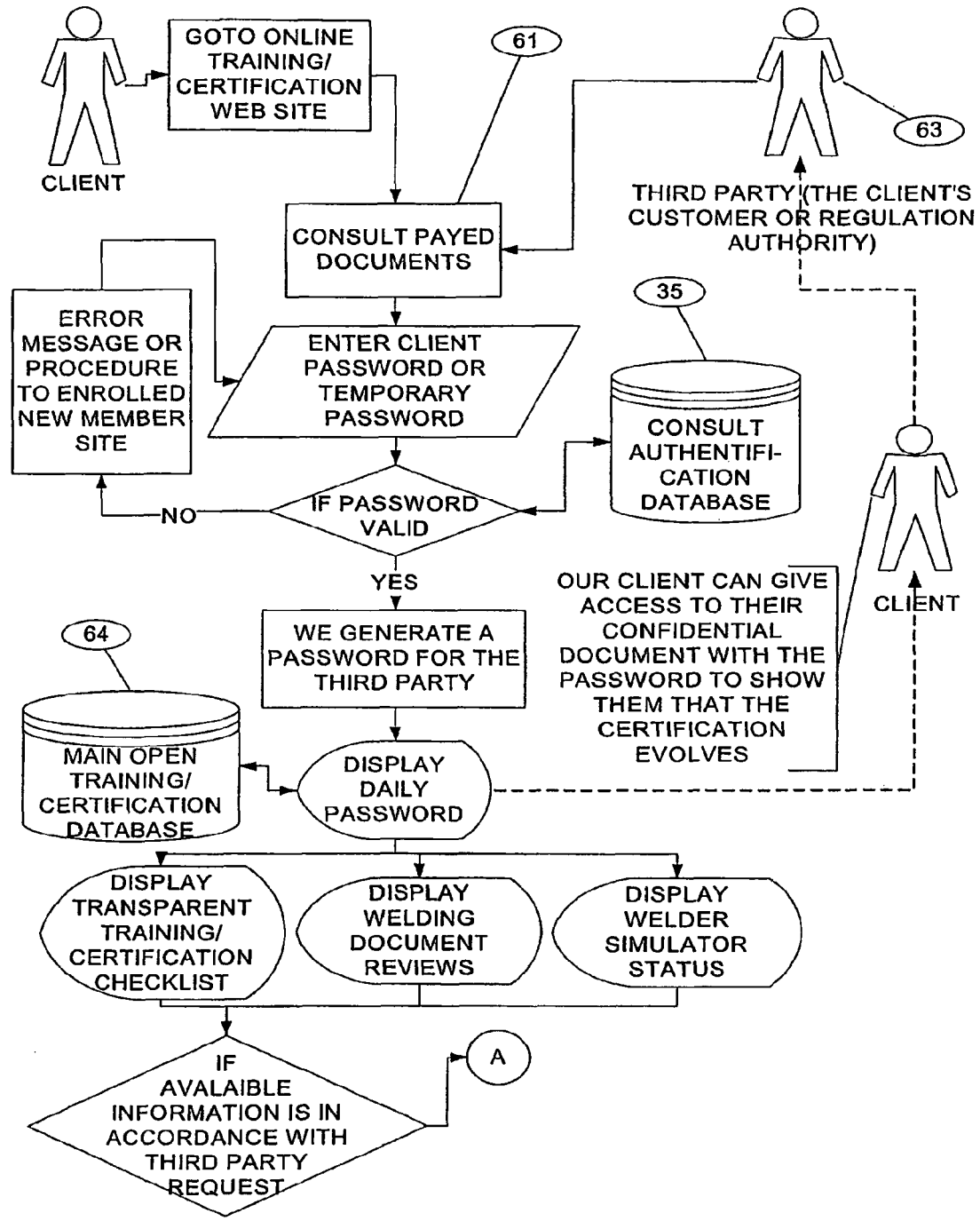
FIG. 6 is a flowchart showing an operation flow of different user interactions in the system according to the present invention.

Referring to FIG. 6, there is shown an operation flow of the training/certification method for the welding scenario, an operation flow of accepting or registering a new member site and a layout example of the authentication database 35.

Figure 7:
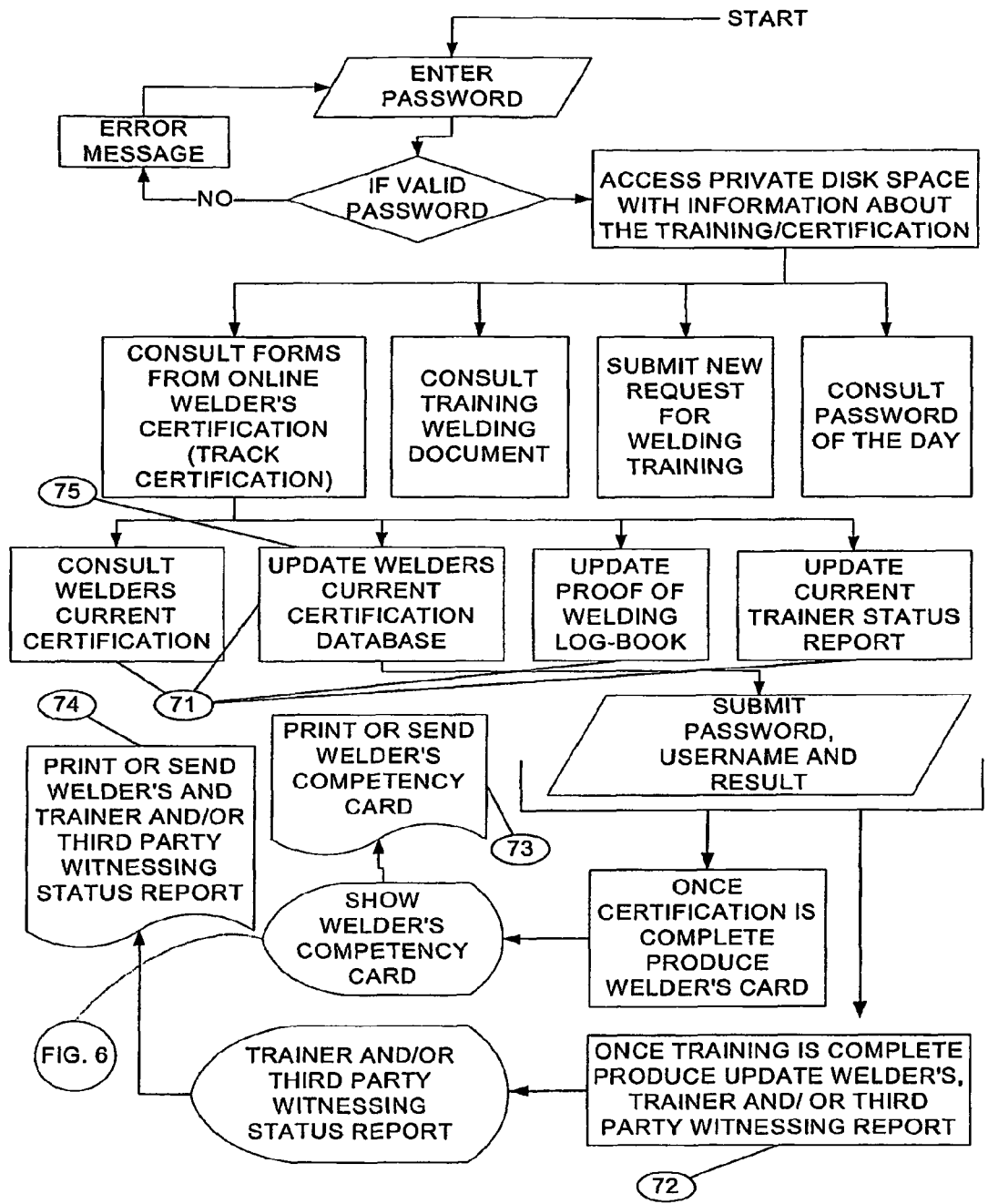
FIG. 7 is a flowchart showing an operation flow of certification steps & interface display in the system according to the present invention.

Referring to FIG. 7, there is shown an operation flow of training/certification steps and interface display for the welding scenario.

Referring to FIG. 8, there is shown an example of a welding card holder.

Figure 9:
FIG. 9 is a diagram showing an example of an online certification checklist used in the system according to the present invention.

Referring to FIG. 9, there is shown an example of online welding certification checklist traceability of welder test scheduling of qualification of the welder/welding operation, machine welders and welding operator qualification test planning sheet.

Figure 2:
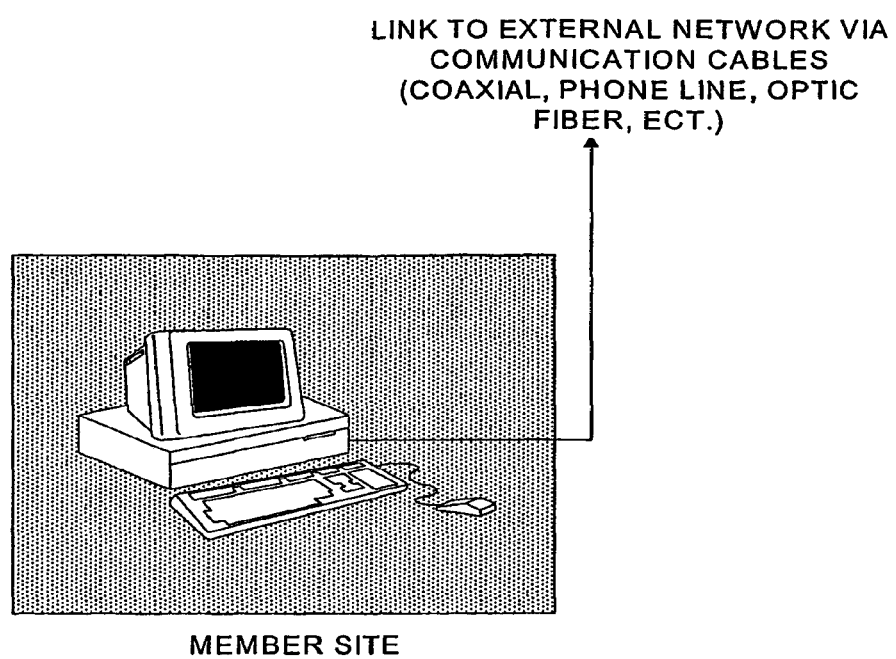
FIG. 2 is a schematic diagram illustrating a training station.

FIGS. 10 to 20 show the virtual simulator method and system method interface according to a preferred embodiment related to welding training. The system has client stations connected to a server station. Referring to FIG. 2, each work station may comprise a computer, a monitor and one or many input devices. These input devices will allows the trainee to increase realism of his operation by capturing displacement and orientation information. Examples of such motion capture input device known are conventional mouse, 3D mouse, touch screen, keyboard, electronic pencil or even bend and twist sensitive input strip. These input devices are examples but this invention is not limited to those. The client station may be used for different purposes, according to the access rights allocated to the user. For example, a trainee will have rights for performing various tests but will of course have no rights to change some data like his/her test results, his/her skill level. Such rights will possibly be granted to the trainer. Other rights will be granted to the certifying third party.

Welding data sheets such as FIG. 10 help welding trainee to set-up their work environment to perform optimize weld results. For example this welding data sheet will be used to configure the online virtual simulator system (FIG. 11).

Referring to FIG. 11, the simulator has an interface for interaction with the trainee. The interface can be conveniently provided by the monitor of the computer used by the trainee.

Referring to FIG. 10, there is shown an example of weld transverse cut 102. These cuts vary according to the weld preparation. A double U groove weld preparation 101 is shown. Different shapes can be simulated by this Process Data Sheet (PDS). A list of simulation shapes possibilities can be identified in reference named "ANSI/AWS D2.4, Standard Symbols for Welding, Brazing, and Non-destructive Examination". This PDS is an equivalent of a frame taken out from a animation movie such as a multimedia video. In other words, this PDS image is an animation picture extract shot representation of a Weld transversal cut with the list of essentials variables that defined it.

Referring again to FIG. 11, the interface has a first window section in which the elements 105 to 128 used in the test are displayed. Another window section displays test parameters and controls 129 to 134 for interactively adjusting them if necessary. The simulator generates these elements based on preset data retrieved from 36 (shown in FIG. 3) item 36 database. The neuromuscular processor simulator does the required calculation on time and online in response to the starting procedure set in motion by the trainee with an input device (e.g. a mouse) and produces an image e.g. elements 135 to 138 that replicates a weld bead according to the welding parameter management by the trainee.

For example, two part of metal 135 and 136 are assembled in a proper position and essentials variables 105 to 134 are set in a proper manner to produce sound welds according to code criteria. When these essential variables are used in conjunction with a multimedia device that will allow a computer screen to receive signal 137 a virtual image of a weld 138 is obtained. This image can be processed to certify code and rule-of-the-art compliance. An unlimited application possibility of this method can be developed for any neuromuscular activities.

Figure 12:
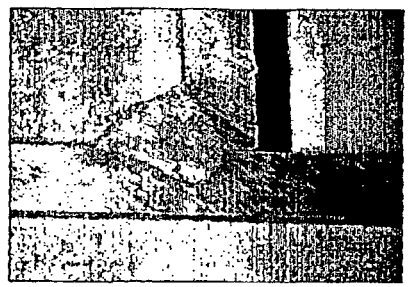
FIG. 12 is a view illustrating a macrographic cut of a real welding assembly.

The objective of the trainee is to obtain a sound weld with a good management of his welding parameters. Sound weld are defined in welding code or handbook. An example of a good weld can be visualized in macrographic cut as shown in FIG. 12. This result can only be viewed after destructive test and cannot be monitored during welding with conventional welding technology.

Figure 13:
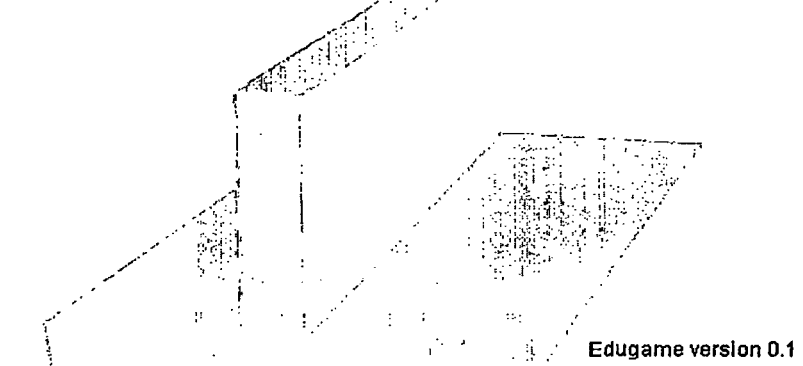
FIG. 13-17 are schematic diagrams showing the simulation process at different stages according to the present invention.

Referring to FIG. 13, there is shown that the essential variables of the simulator system are adequately configured with the motion capture input device cursor help that is set in motion by the motion capture input device such as a computer mouse. For example, FIG. 13 illustrates a simulation of the FIG. 12. This case is the welding set-up of 2 6".times.6".times.⅜" alloy 6061-T6 aluminum plates aluminum with 0.045" diameter filler aluminum alloy 4043 in the horizontal position. The generally recognized dimensional code requirement size of the weld is 6 mm (¼") minimum with a convexity of 3 mm (⅛") maximum and a minimal penetration of 2 mm (1/16"). Therefore with the motion capture input device cursor, the trainee adjusts the current source to a wire speed adjustment, just like in real situation. In the illustrated example, the current source is activated for 250 amps.

The trainee test acceptance criteria will be in accordance with the generally recognized code requirements.

Figure 14:
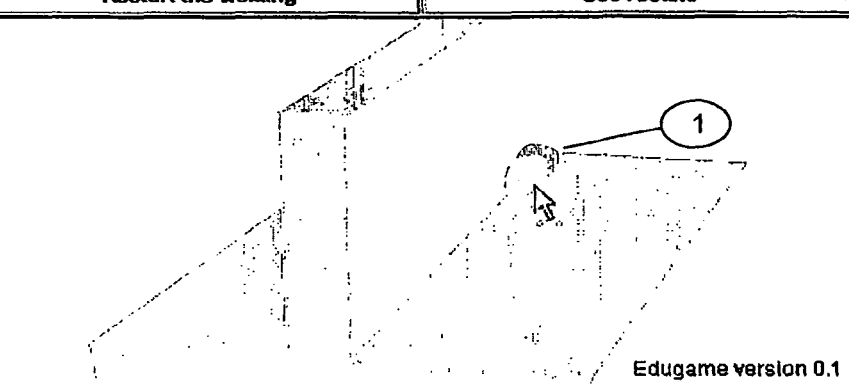

When the trainee considers that the test set-up is adequate, he/she must affix the mouse cursor at the starting point of the assembly as shown in FIG. 14 for the tool positioning process. As soon as the trainee clicks on the motion capture input device, in this case a computer mouse, the neuromuscular simulator processor is started and activates a time calculation required for result output. In this patent application, this operation is visually shown by the build-up of an virtual hot-spot 1 (FIG. 14). The trainee then must move the hot-spot created by the mouse cursor on the plates to join contact axis to demonstrate a sound weld. This kinematic translation operation from a start to a stop with the mouse cursor leave a virtual metal deposition 3 (FIG. 15) similar as in a real time welding operation. Kinematic law equations such as displacement, speed and acceleration are of the important criteria but the straightness of the cursor motion is also. This precision is in the millimeter range.

As soon as the trainee clicks on the motion capture input device, in this case on the computer mouse, an instruction is given to the neuromuscular simulator processor to calculate a material deposition rate which coincides with an image simulating the real aluminum weld deposition. For example, this processor calculates the liquid state aluminum flow rate as long as the welder trainee will not have release the input device trigger which in this particular case is the computer mouse. If the trainee operates in a variable bracket combination which allows him/her to deliver a welded zone according to the training requirements, then the result will be a sound weld and considered without defect. If he does not operate according to the Ideal training requirements or according to the rules of the art or the codes foreseen for that purpose, this deposited metal mass in the operating zone will have the consequence to create defects which will be visible as shown in FIG. 15.

Figure 15:
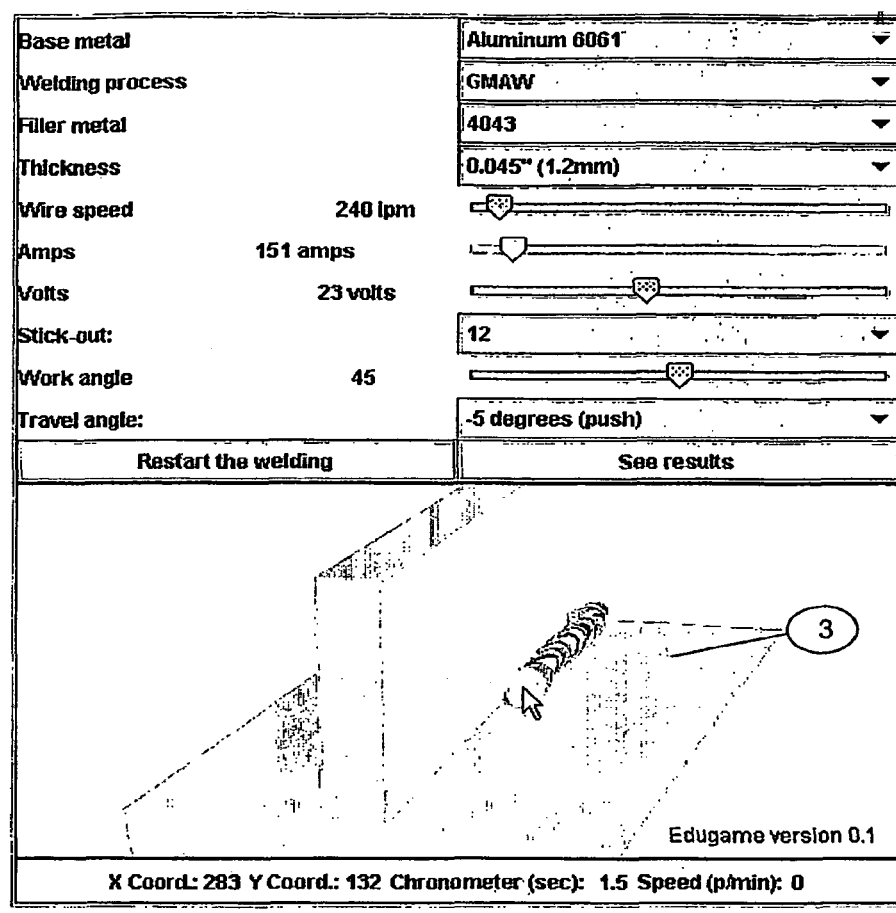

Referring to FIG. 15, there is shown a start-and-stop half-distance which is known in the field of welding as the compulsory stop-departure in the middle of the weld of an assembly test. This stop-and-start zone is always a potential zone of defects and the restart has to be in accordance with the code currently recognized in the field. The trainee handles the motion capture input device cursor quite like he would handle a welding gun trigger. The trainee has to maintain a constant speed and aim to maintain the straightness of the path to deliver a sound weld. His/her 2nd start on the stop will be also visually inspected. It's because the demonstration of a stop-and-stop is also a factor of success or failure during a welder test.

Figure 16:
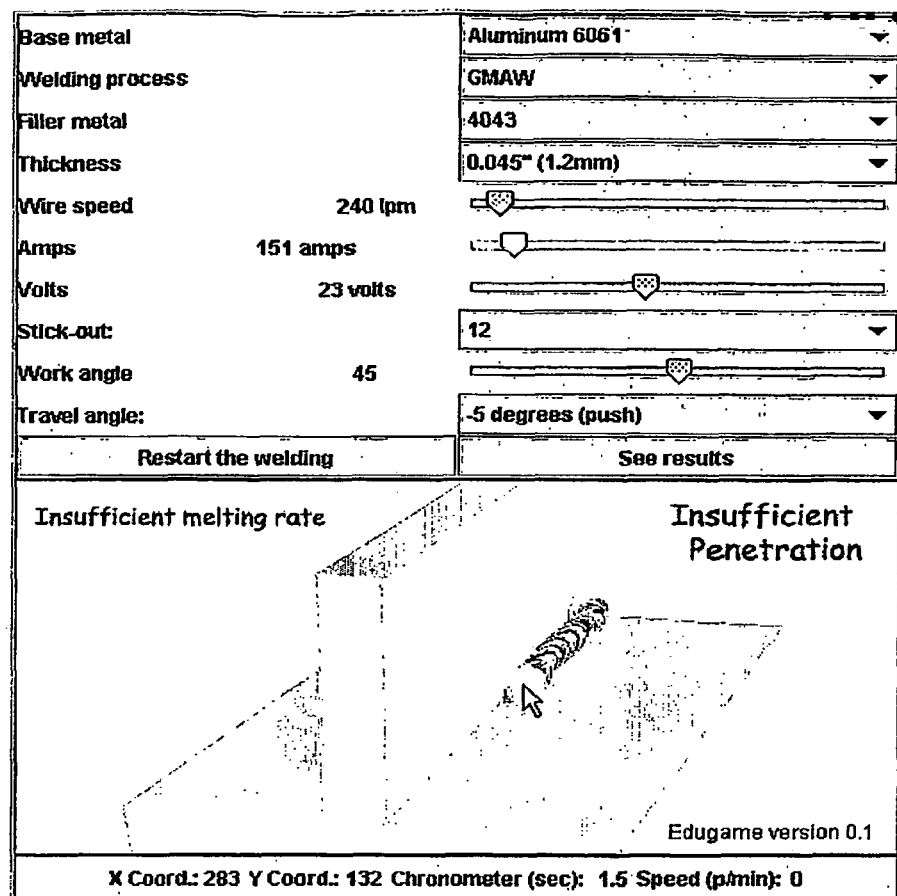

Referring to FIG. 16, there is shown that during the welding when the speed is too big or small or when the cursor is not well positioned, error messages appear "Incorrect deposition" or "insufficient penetration". These error messages are examples of the possible monitoring with the neuromuscular simulator. Others on-time process monitoring during welding are possible such as "Undercut", "Porosity" or "Cold lap".

Figure 17:
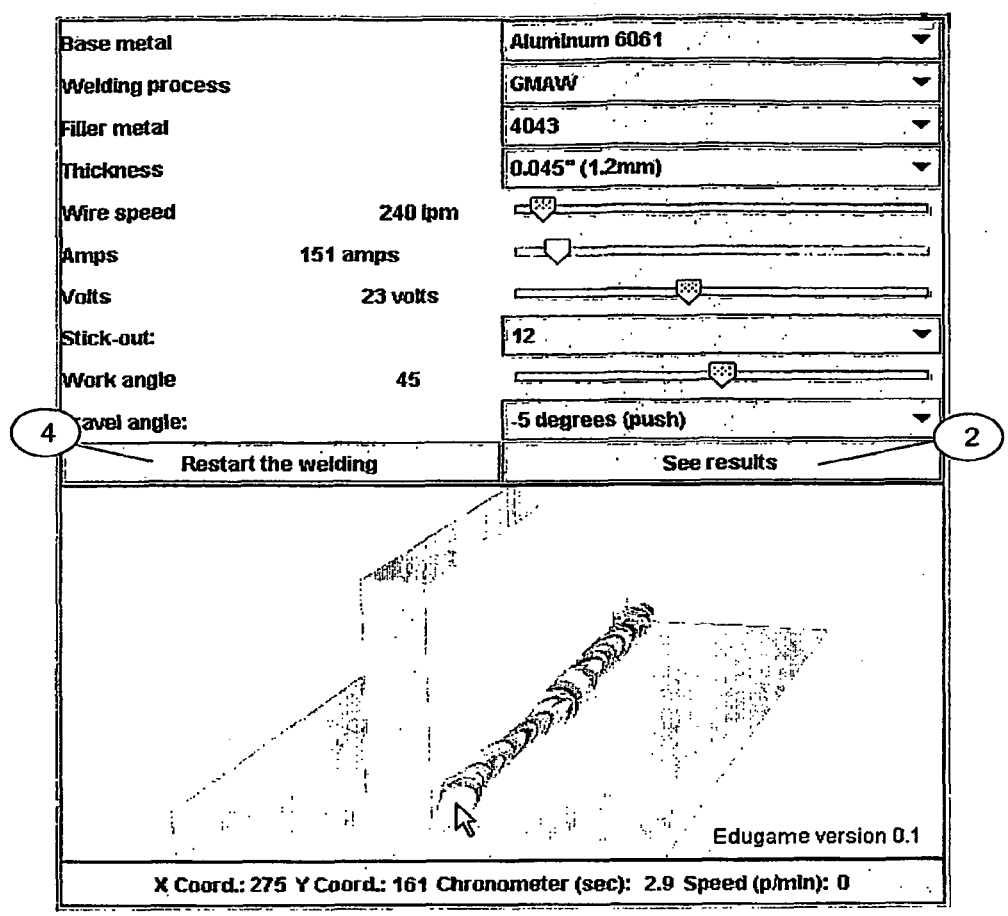

Referring to FIG. 17, when the weld is completed the neuromuscular simulator processor stops the stopwatch and allows then to compare the speed with the real case which is required according to the data banks which are available to this neuromuscular simulator processor. A trainee auto-evaluation is always possible and if he/she requires it, a virtual non-destructive or destructive visual exam is then possible by the trainer or any other online third party required to ensure welding code requirement compliance.

Figure 18:
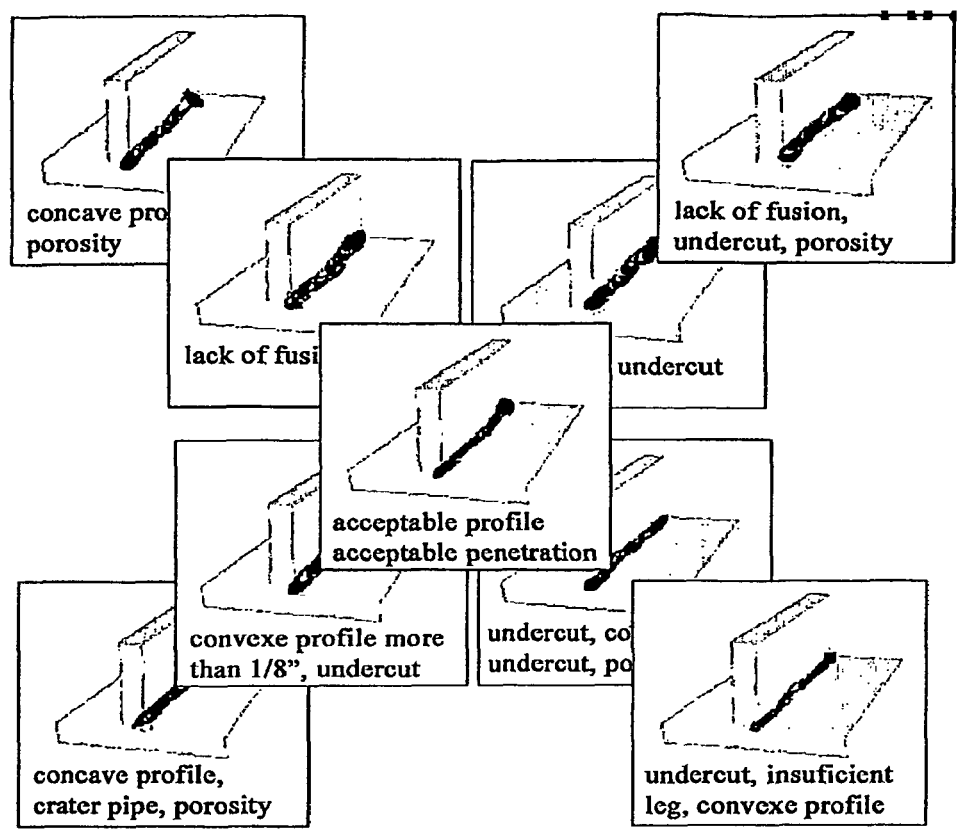
FIG. 18 is a schematic diagram illustrating loop result of non-satisfactory neuromuscular tests.
Figure 20:
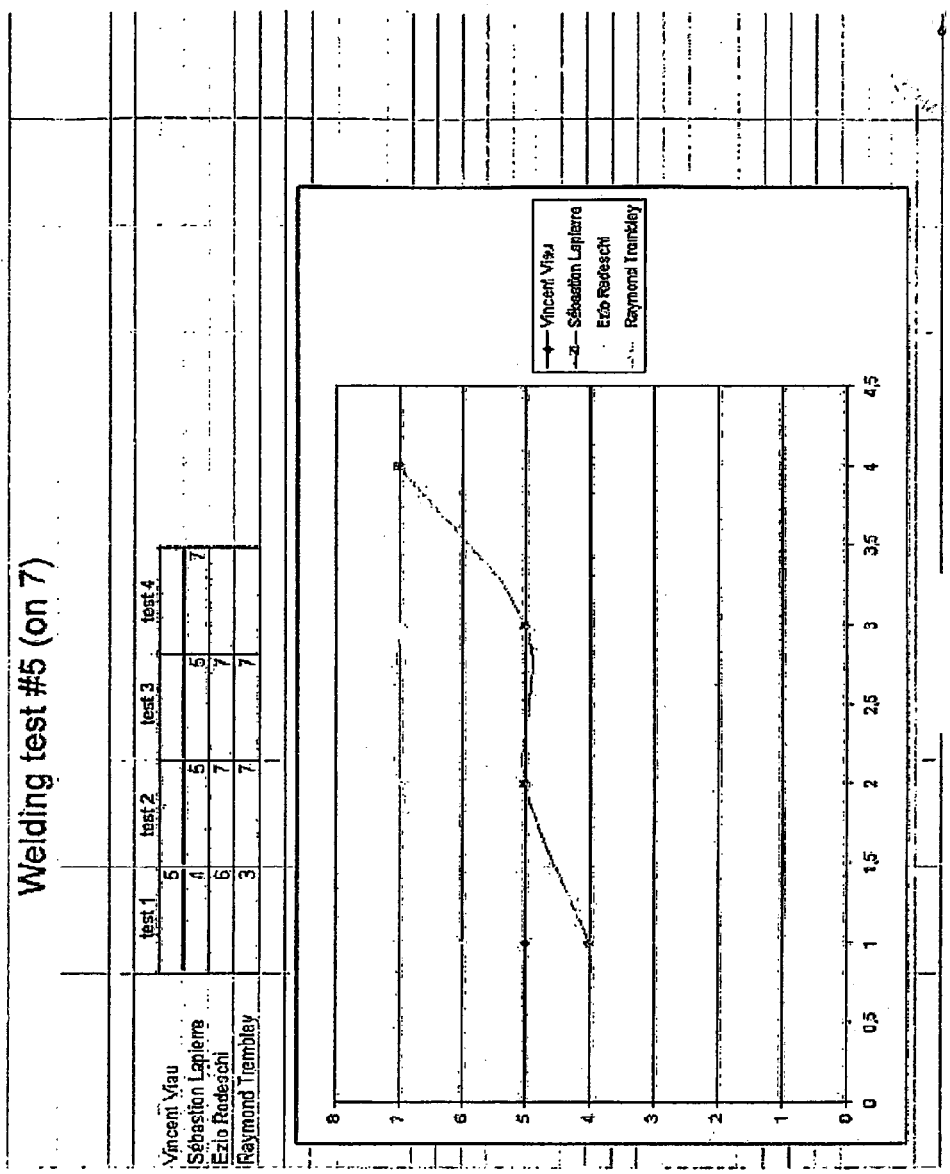
FIG. 20 shows an example of learning curves produced with the system according to the present invention.

The trainee can then repeat as often as he/she wishes it or as often as he/she is allowed in the training environment by pushing button 4 (FIG. 17) for a complete visual inspection, non-destructive examination or destructive examination result of a neuromuscular test. Referring to FIG. 18, the various results obtained allow the trainer and the third party witness or the certification representative to observe a detailed quality and defects retracability report obtained according to build-up of his training program. Referring to FIG. 20, by experimenting several times the welding parameters, the trainee builds-up a learning curve. The trainee can re-experiment the weld deposition as often as he/she wants and a learning curve file built-up as much as he/she builds-up results.

The trainee will also see the visual test results or defects not usually available as soon as the weld is completed. For example, the trainee will see the weld bead with root lack of penetration, insufficient weld side or weld bead convexity not according to code.

A learning curve is also available to the trainee, for the trainer or for the third party witnessing auditor if required. All or only the decision-making person will decide if the trainee is then capable to switch to the stage of the practical tests with real welding equipments and consumables.

Referring to FIG. 19, the produced mathematical curves allow to generate a big number of images or numeric signals which shall be use to improve the training program and generate also more complex functions such as the examples described below.

Visual exams (according to acceptance criteria code)

Non-destructive exams: (ultrasonic, X-rays, magnetic particle and liquid penetrant)

Destructive exams: (bending, tension, fracture, macrography)

The complete path generated could be saved and be used on a welding programmable machine for a possible repetitive use Ontime and online welding robot guidance with remotely located expert using existing vision system Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A system for neuromuscular training of welding via a communication network, comprising:

a computer processor connectable to the communication network, the processor capable of performing operations comprising:

retrieving data representative of a welding training scenario from a database in response to a user selection on an input device;

generating test elements, parameters and controls based on the retrieved data;

monitoring use of the input device by the user;

performing calculations of a simulated environment in response to the use of the input device by the user and the test elements, parameters and controls, the calculations comprising dynamics, fluid mechanics and thermodynamics;

generating real time images replicating the simulated environment of management of the test elements by the user, the real time images coinciding with a real weld; and recording results of the simulation in the database.

2. The system of claim 1, further comprising the database, the database storing data relative to one or more of (A) a code of conduct, (B) state-of-the-art, (C) physics law equations, (D) technical code and technique for physical activities requiring training and certification for a user, or (E) training scenarios complying with the code of conduct, state-of-the-art, physics law equations, technical code and technique.

3. The system of claim 1, further comprising a multimedia device connectable to the communication network, the multimedia device having an input device for interaction with a user.

4. The system of claim 1, further comprising a stopwatch circuit.

5. The system of claim 1, wherein the system comprises a virtual simulator.

6. The system of claim 1, wherein the processor is capable of certifying with a third party witnessing from a certification bureau that the online use of the input device by the user meets minimum requirements to satisfy a code of conduct.

7. The system of claim 1, wherein the processor is capable of recording the real time images in the database and processing the real time images to certify code and rule-of-the-art compliance.

8. The system of claim 7, wherein the processor is capable of:

analyzing the real time images and the test elements to produce test result data;

comparing the test result data with model result data stored in the database and producing consequent markings of the test result data; and recording the markings in the database.

9. The system of claim 8, wherein the processor is capable of:

building a learning curve of the markings; and storing the learning curve in the database.

10. The system of claim 3, wherein the processor is capable of compiling the real time images and the test elements of successive tests performed by the user into the database in a form of playbacks selectively playable on the multimedia device in response to a user request.

11. The system of claim 3, wherein the multimedia device comprises a user interface displaying the real time images.

12. The system of claim 11, wherein the user interface comprises a first window section displaying the test elements, and a second window section displaying the test parameters and controls.

13. The system of claim 1, wherein the processor is capable of processing the real time images for destructive and non-destructive examination of the test elements on the multimedia device in response to a user request.

14. The system of claim 1, wherein the test elements comprise speed and spatial data.

15. The system of claim 3, wherein the input device comprises a motion capture input device.

16. A system for neuromuscular training of welding via a communication network, comprising:

a computer processor connectable to the communication network, the processor capable of performing operations comprising:

retrieving data representative of a welding training scenario from a database in response to a user selection on an input device;

generating test elements, parameters and controls based on the retrieved data;

monitoring use of the input device by the user;

performing calculations of a simulated environment in response to the use of the input device by the user and the test elements, parameters and controls, the calculations comprising dynamics, fluid mechanics and thermodynamics;

generating real time images replicating the simulated environment of management of the test elements by the user, the real time images coinciding with real a weld; and recording results of the simulation in the database, wherein the system is configured to train welding robot guidance with a remotely located expert using a vision system.

17. A method for neuromuscular training of welding via a communication network, comprising:

retrieving data representative of a welding training scenario from a database in response to a user selection on an input device;

generating test elements, parameters and controls based on the retrieved data;

monitoring use of the input device by the user;

performing calculations of a simulated environment in response to the use of the input device by the user and the test elements, parameters and controls, the calculations comprising dynamics, fluid mechanics and thermodynamics;

generating real time images replicating the simulated environment of management of the test elements by the user, the real time images coinciding with a real weld; and recording results of the simulation in the database.

18. The method of claim 17, further comprising recording the real time images in the database and processing the real time images to certify code and rule-of-the-art compliance.

19. The method of claim 17, further comprising:

analyzing the real time images and the test elements to produce test result data;

comparing the test result data with model result data stored in the database and producing consequent markings of the test result data; and recording the markings in the database.

20. The method of claim 17, further comprising:

building a learning curve of the markings; and storing the learning curve in the database.

21. The method of claim 17, further comprising compiling the real time images and the test elements of successive tests performed by the user into the database in a form of playbacks selectively playable on a multimedia device in response to a user request.

22. The method of claim 17, further comprising processing the real time images for destructive and non-destructive examination of the test elements on a multimedia device in response to a user request.

23. The method of claim 17, further comprising configuring the database with the on-line simulator processor as a function of the test parameters.

24. The method of claim 17, further comprising producing warning signals on the multimedia device depending on actions performed by the user with respect to a variable bracket of successful results determined using the data stored in the database.

25. The method of claim 22, further comprising displaying the real time images on a user interface of the multimedia device.

26. The method of claim 17, wherein the test elements, parameters and controls are all user configurable variables.

27. A method for neuromuscular training of welding via a communication network, comprising:
- retrieving data representative of a welding training scenario from a database in response to a user selection on an input device;
- generating test elements, parameters and controls based on the retrieved data;
- monitoring use of the input device by the user;
- performing calculations of a simulated environment in response to the use of the input device by the user and the test elements, parameters and controls, the calculations comprising dynamics, fluid mechanics and thermodynamics;
- generating real time images replicating the simulated environment of management of the test elements by the user, the real time images coinciding with a real weld; and
- recording results of the simulation in the database,
- further comprising training welding robot guidance with a remotely located expert using a vision system.

* * * * *